March 18, 1958     E. R. BRADLEY     2,826,864
DISPLAY AND PRESERVING DEVICE FOR CUT FLOWERS AND PLANTS
Filed Aug. 20, 1954
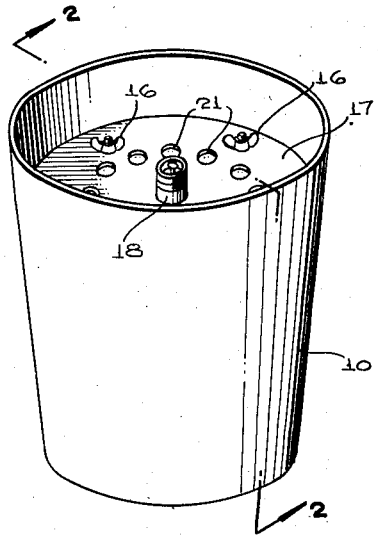
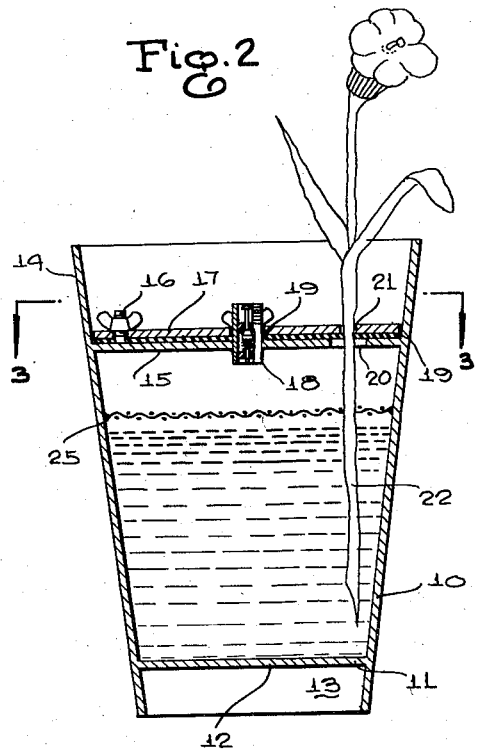
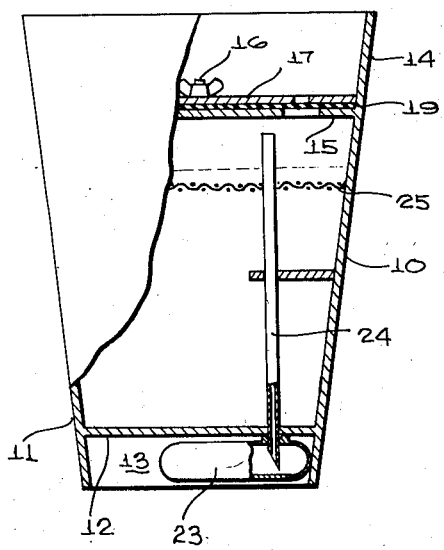
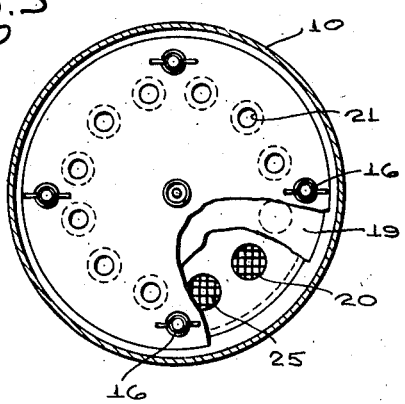
INVENTOR.
EARL R. BRADLEY
BY
McMorrow, Berman + Davidson
ATTORNEYS

2,826,864

DISPLAY AND PRESERVING DEVICE FOR CUT FLOWERS AND PLANTS

Earl R. Bradley, Morehead, Ky.

Application August 20, 1954, Serial No. 451,090

3 Claims. (Cl. 47—41)

This invention relates to a display and preserving device for cut flowers and plants.

When cut flowers or plants are displayed in wreaths, baskets and like devices, they show deterioration in appearance after a short interval of time, such deterioration being due to what is termed wilting. Wilting is primarily due to the loss of water, soluble nutrients, or both, from the leaves, petals, stems, at a rate greater than the water and nutrients are replenished or taken up by the cut flowers or plants from their environment. Under normal growing conditions, the rate of loss of water and the rate of replenishment of water is in balance, the loss of water being caused by evaporation and the rate of replenishment of the water and soluble nutrients contained therein to the stem and roots being caused by osmosis.

The present invention has for its principal object, the provision of a device in which cut flowers or plants are preserved under conditions simulating that of growing flowers and plants.

Another object of the present invention is the provision of a device which is simple of structure, and which is highly efficient in action.

These and other objects and advantages of the present invention will be more fully apparent on consideration of the following description taken with an examination of the annexed drawings, in which like numerals indicate like parts throughout the several views and in which:

Figure 1 is a plan view in perspective of the invention;

Figure 2 is a view in cross section of the invention taken on line 2—2 of Figure 1 with a flower in place;

Figure 3 is a vertical view on line 3—3 partly in section; and

Figure 4 is a partially cross sectional view of a second embodiment of the present invention.

Referring in greater detail to the drawings, the device of the present invention comprises a container 10 having its lower end 11 closed and provided with a false bottom 12 to provide a recess 13.

The portion adjacent the upper end 14 of the vase or container 10 has a partition 15 extending transversely across the interior of the vase which partition is secured by its periphery to the inner wall of the container 10 and having bolts 16 welded thereon and extending upwardly therefrom. A removable circular pressure plate 17 has holes to fit over the bolts 16 and an air valve 18 which is sealed to the partition 15 by welding or other means also extends through a hole 19 in the circular plate.

Sandwiched inbetween the partition and the plate 15 and 17 respectively is a replaceable disc made of rubber or other resilient material and it also has holes for bolts 16 and the valved gas inlet 18. Both the partition and the plate have a plurality of other holes 20 and 21, aligned with each other, and in operation the rubber disc 19 is punched or perforated with a hole smaller than the stem 22 of the flower being inserted, to provide, a substantially tight seal around the stem.

In the embodiment shown in Figures 1 to 3, the air valve 18 is used to compress a quantity of air on top of a quantity of water in the container, thus putting the water under pressure in the container, to force it up the stem of the flower.

In the embodiment of the invention shown in Figure 4 the recess 13 is seen to contain a gas cartridge 23 which connects to the gas conduit 24 and permits a charge of compressed gas to be introduced into the container in the same manner as through the air valve 18.

In both of the embodiments, it has been found that the seal of the rubber disc, where perforated to receive a flower stem, will maintain a better seal if the flower stem is held erect, and for this purpose a wire mesh screen 25 having fairly large openings is positioned in the container to provide lateral support of the stem.

The operation of the device is believed to be fully apparent, and while a single flower is shown here, it is to be understood that the vase is meant to hold a large number of flowers or plants with their stems each in a hole of its own in the disc, and that it is meant to be useful for plant experimentation by modifying the liquid nutrients and by the introduction of various dyes, chemicals or other materials, and that plants, bulbs, roots and the like may be used.

While only preferred embodiments of the present invention are here shown and described, many other embodiments are contemplated and may be practiced without departing from the spirit and scope of the present invention as set forth more clearly in the appended claims.

What is claimed is:

1. A flower vase comprising a container, a partition in the portion adjacent the upper end extending transversely across the interior thereof and secured to the inner wall of the container, a pressure plate superimposed upon said partition, a rubber disc interposed between said partition and said plate, means removably securing said plate and disc to said partition, said partition and said plate being each provided with a plurality of holes, the holes of said partition being in registry with the holes in said plate and adapted to receive flower stems, there being a plurality of holes in said disc, a hole of said disc being in registry with adjacent holes in said partition and plate and being of size smaller than the registering adjacent holes of said partition and plate so as to provide a tight seal around a flower stem when inserted into the adjacent registering holes of said partition and plate, and means for supplying said container with gas under pressure to a space therewithin over a quantity of water in said container.

2. A flower vase comprising a container, a partition in the portion adjacent the upper end extending transversely across the interior thereof and secured to the inner wall of the container, a pressure plate superimposed upon said partition, a rubber disc interposed between said partition and said plate, means removably securing said plate and disc to said partition, said partition and said plate being each provided with a plurality of holes, the holes of said partition being in registry with the holes in said plate and adapted to receive flower stems, there being a plurality of holes in said disc, a hole of said disc being in registry with adjacent holes in said partition and plate and being of size smaller than the registering adjacent holes of said partition and plate so as to provide a tight seal around a flower stem when inserted into the adjacent registering holes of said partition and plate, and a valved gas inlet connecting with the interior of said container below said partition whereby gas under pressure may be introduced into said container over a quantity of liquid therein for forcing liquid into the flower stem.

3. A flower vase comprising a container, a partition in the portion adjacent the upper end extending transversely across the interior thereof and secured to the inner wall of the container, a pressure plate superimposed upon said partition, a rubber disc interposed between said partition and said plate, means removably securing said plate and disc to said partition, said partition and said plate being each provided with a plurality of holes, the holes of said partition being in registry with the holes in said plate and adapted to receive flower stems, there being a plurality of holes in said disc, a hole of said disc being in registry with adjacent holes in said partition and plate and being of size smaller than the registering adjacent holes of said partition and plates so as to provide a tight seal round a flower stem when inserted into the adjacent registering holes of said partition and plate, a gas conduit connecting at one end with said container in the space within below said partition, said container being formed with a recess to receive a gas cartridge therein, said gas conduit being connected at its other end to said gas cartridge whereby a gas under pressure may be admitted into said container above a quantity of liquid therein for forcing liquid into the stem of a flower inserted through adjacent registry holes in said partition and plate and said disc.

References Cited in the file of this patent

UNITED STATES PATENTS

| | | |
|---|---|---|
| 2,060,005 | Fletcher et al. | Nov. 10, 1936 |
| 2,218,157 | Seidel | Oct. 15, 1940 |

FOREIGN PATENTS

| | | |
|---|---|---|
| 156,466 | Germany | Dec. 2, 1904 |
| 418,288 | France | Sept. 23, 1910 |